(12) United States Patent
Semyonov et al.

(10) Patent No.: US 10,481,984 B1
(45) Date of Patent: Nov. 19, 2019

(54) BACKUP OF VIRTUAL MACHINES FROM STORAGE SNAPSHOT

(71) Applicant: Acronis International GbmH, Schaffhausen (CH)

(72) Inventors: Vasily Semyonov, Moscow (RU); Stanislav S. Protassov, Moscow (RU); Serguei M. Beloussov, Singapore (SG); Mark Shmulevich, Moscow (RU); Victor Shulga, Moscow (RU)

(73) Assignee: ACRONIS INTERNATIONAL GMBH, Schaffhausen (CH)

( * ) Notice: Subject to any disclaimer, the term of this patent is extended or adjusted under 35 U.S.C. 154(b) by 938 days.

(21) Appl. No.: 14/948,747

(22) Filed: Nov. 23, 2015

(51) Int. Cl.
*G06F 16/11* (2019.01)
*G06F 11/14* (2006.01)

(52) U.S. Cl.
CPC ........ *G06F 11/1464* (2013.01); *G06F 16/128* (2019.01); *G06F 2201/84* (2013.01)

(58) Field of Classification Search
CPC ........... G06F 2009/45562; G06F 16/11; G06F 16/128
See application file for complete search history.

(56) References Cited

U.S. PATENT DOCUMENTS

| | | | |
|---|---|---|---|
| 9,483,358 B1* | 11/2016 | Balasubramanian | ........................ G06F 11/1451 |
| 9,720,921 B1* | 8/2017 | Bhattacharyya | .... G06F 9/45533 |
| 2013/0262638 A1* | 10/2013 | Kumarasamy | ........ G06F 15/177 709/221 |

* cited by examiner

*Primary Examiner* — Robert W Beausoliel, Jr.
*Assistant Examiner* — Nirav K Khakhar
(74) *Attorney, Agent, or Firm* — Arent Fox LLP; Michael Fainberg

(57) ABSTRACT

A method for minimizing VMWARE™ snapshot lifetime, by reading data from a storage snapshot created on the VM storage side. The reading is performed by mounting the storage snapshot as a new datastore on an ESX(I) host and accessing the host using a standard VMWARE™ VDDK (vStorage API) method. A pre-configured source ESX(I) host contains a VM that needs to be backed up. A SAN storage connected to the ESX(I) host over iSCSI or Fibre-Channel or NFS protocols is used. The backup agent, which contains the proprietary code, is installed on a physical or a virtual machine connected to an ESX(I) host. This backup agent maintains the operations with the ESX(I) host and the SAN storage and coordinates the VM virtual disks data read and write operations. The backup agent contains the executable code, which provides compatibility with SAN storage and ESX(I) host.

13 Claims, 4 Drawing Sheets

BACKUP OF VIRTUAL MACHINES FROM STORAGE SNAPSHOT

BACKGROUND OF THE INVENTION

Field of the Invention

This invention relates to a method for backup of Virtual Machines (VMs), and more particularly, to optimizing backup of VMs by reducing a lifespan of a VM snapshot.

Description of the Related Art

Operation of a Virtual Machine during a backup always presents a problem, since the backup process affects the performance of the VM. This problem is particularly critical in VMWARE™ Virtual Machines (VMs). This is also critical for other vendors who use redirect-on-write snapshot concept (where changes are saved into delta file). The backup process uses VMWARE™ snapshot, which reflects a current state of a VM (i.e., virtual disks) on the production storage. The snapshot contains VM configuration (VMX) and data on the VMs disks (VMDK files representing the virtual disks belonging to the VM).

When a hypervisor issues a command to create a VM snapshot, all writes to the VMDK files are suspended. The hypervisor creates a delta file (e.g., a file named delta0001.vmdk, delta0002.vmdk, etc.) and all writes are redirected to the delta file. Thus, during creation of the snapshot, all data reads can still be performed from the VMDK files, but the writes can only go to the delta file. Thus, the creation of the snapshot includes a combination of virtual disks and the delta file. However, after the snapshot is created, the delta file does not belong to the snapshot and is owned by the VM itself. Many vendors use the redirect-on-write snapshot concept, but some also use copy-on-write snapshots that are less affected by this problem.

The VM backup includes creation of the snapshot, reading of the snapshot from the base disk and deletion of the snapshot. The snapshot presence means that all write requests going into the VM are written into the additional snapshot file, hence causing a negative VM performance impact (see a detailed explanation here: vmdamentals.com/?p=332). Another negative side-effect of the snapshot presence is datastore space consumption, which grows over time as long as the snapshot is present. This slows down the VM performance significantly. Reading large amounts of data from the snapshot into the backup can take several hours in case of terabytes of data. Thus, the VM is slowed down for all this time. The delta file can also grow significantly during creation of the snapshot if many writes into the VM disk occur. Thus, deletion of the snapshot can take longer, because all data from the delta file needs to be written back into the base disk. This process is referred to as snapshot consolidation. The snapshot consolidation is quite long, and it creates additional load on VM hosts, e.g. VMWARE™ ESX(I) host.

While this is a design-specific problem of a snapshot consolidation in VMWARE™ architecture, this problem is likely the same for other vendors. The backup from hardware snapshot is implemented using very similar approach: create VMWARE™ snapshot→create SAN LUN (logical unit number) snapshot→delete VMWARE™ snapshot→read data from SAN LUN snapshot. However, instead of using VMWARE™ VDDK (vStorage API) to read data from the virtual disks (located on SAN LUN), the reading is performed by connecting the backup agent directly to the SAN storage using storage protocols.

For example, for a Hyper-V architecture, it is possible to have a backup agent installed inside the host and, thus, get access to the VM storage directly. The VM storage is transparent for the agent since it is located on the NTFS and can be read via native Windows™ OS drivers. In case of VMWARE™, the situation is different, since the VM storage is located on a proprietary VMFS file system, and it is not possible to parse VM files from the file system without specific prerequisites.

Reading VM virtual disks data using SAN storage protocols (e.g., iSCSI/FC/NFSshare) implementation is complicated by the fact that such reading has to be implemented individually for each SAN model, and implementation depends highly on particular SAN vendor specifics. Thus, it cannot be used in its conventional implementation.

Accordingly, an efficient method for reducing VMWARE™ VM backup time and improving the VM performance during the backup is desired.

SUMMARY OF THE INVENTION

Accordingly, the present invention is directed to a method for optimizing backup from a snapshot of Virtual Machines (VMs) by reducing lifespan of the VM snapshot that substantially obviates one or more of the disadvantages of the related art.

In one aspect of the invention, a method for minimizing a VM host such as VMWARE™ snapshot lifetime, by reading data from storage snapshot created on the VM storage side (the storage used by VM hosts such as VMWARE™ hypervisor to store VM data on) is provided. The reading is performed by mounting the storage snapshot as a new datastore on an ESX(I) host and accessing the host using a standard VMWARE™ VDDK (vStorage API) method. The snapshot of the LUN can be mounted to another none-native host with some modifications. Other vendors (e.g., Veeam™) can use a hidden VMWARE API to read VM data from SAN LUN snapshots without attaching them to any virtualization host.

A pre-configured source host, e.g., an ESX(I) host, contains VMs that need to be backed up. A SAN storage connected to the ESX(I) host over iSCSI or FibreChannel or NFS protocols is used. The backup agent, which contains the proprietary code, is installed on an ESX(I) host, or on any physical or virtual machine, running Windows or Linux OS. Note that the backup agent can be installed on any machine physical or virtual, running Windows™ or Linux OS. There is no need to install anything directly inside ESXi host.

This backup agent maintains the operations with the ESX(I) host and the SAN storage and coordinates the VM virtual disks data read and write operations. The backup agent contains the executable code, which provides compatibility with SAN storage and ESX(I) host.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
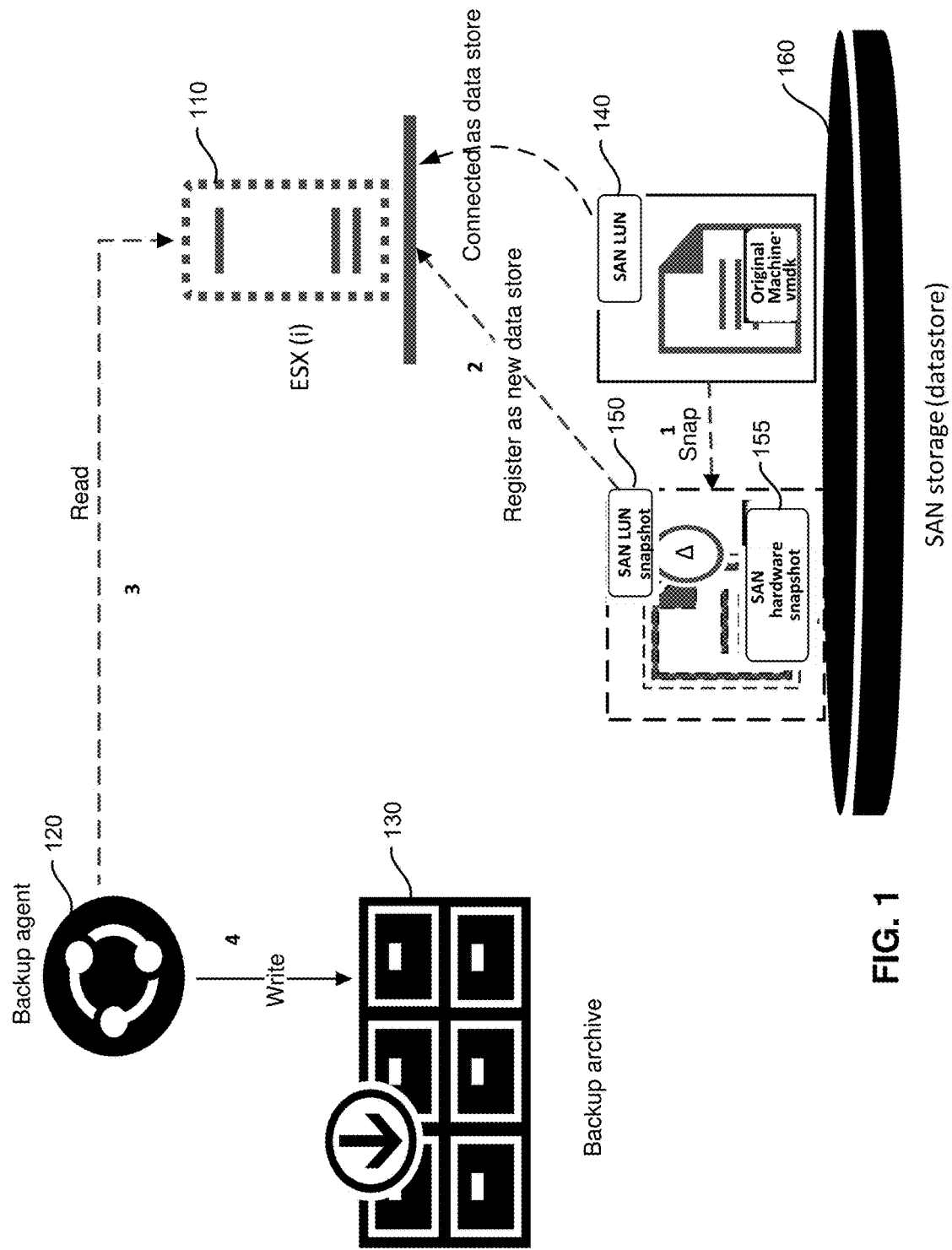
FIG. 1 illustrates a workflow between the elements of the backup system, in accordance with the exemplary embodiment.

Reference will now be made in detail to the preferred embodiments of the present invention, examples of which are illustrated in the accompanying drawings.

In one embodiment, a method for minimizing snapshot lifetime, e.g., VMWARE™ snapshot lifetime, is provided. The snapshot lifetime is reduced by reading data from storage snapshot created on the VM storage side—i.e., the storage used by VMWARE™ hypervisor (or VMM) to store VM data on. The reading is performed by mounting the storage snapshot as a new datastore on a source host, e.g., an ESX(I) host and accessing the host using a standard calls, e.g., VMWARE™ VDDK (vStorage API) call. A pre-configured source ESX(I) host hosts the VM(s) to be backed up. The SAN storage connected to ESX(I) host over such protocols as iSCSI or FibreChannel or NFS, for example.

A backup agent, which contains proprietary code, is installed on a physical or virtual machine, running Windows™ or Linux™ OS and connected to the ESX(I) host. The backup agent maintains the operations with the ESX(I) host and the SAN storage and coordinates (performs) the VM virtual disks data read and write processes. The backup agent contains the executable code, which provides compatibility with SAN storage and ESX(I) host.

A VMWARE™ VM (in one embodiment, or another vendor's VM) snapshot is performed as follows using a standard approach: when the VM snapshot is initiated, a delta disk file is created, and all changes made to the VM are saved to the delta file. Therefore, VM reads data from both the original disk file and from the delta file. This leads to a negative VM performance impact discussed above.

According to an exemplary embodiment, the backup agent is installed on a Windows™ or Linux™ machine (which also can be a physical machine or a VM running on an ESX(I) host or a different vendor's VM). According to the exemplary embodiment, the backup agent is proprietary and is provided in two forms: Windows™ and Linux agent. The backup agent creates a backup of the VM using the following workflow:

A snapshot of the VM to be backed up is created by VMWARE™ standard snapshot procedure). Then, a hardware SAN (Storage Area Network) snapshot is created using SAN storage API (the API itself depends on vendor) called by the backup agent. The APIs depend on a particular vendor of SAN: each of the SANs has SSH access capability with special commands which can be used to be called remotely to control the SAN device. This can be referred to as SAN vendor APIs. They are specific for each vendor (different for HP, EMC, NetApp, etc.).

The VMWARE™ snapshot is removed (using standard VMWARE™ API), and the hardware SAN snapshot is registered on the ESX(I) host as a new datastore (i.e., a standard procedure for any SAN LUN (Logical Unit Number), which can be attached to ESX(I) host as a datastore). The VM virtual disk data is read from the new datastore created on the ESX(I) host using VMWARE™ VDDK (vStorage API used by most vendors for backup, or a similar API if a different vendor's host/VM is used).

This new datastore is, in fact, a clone from the original datastore, which contains the state of the original datastore at the moment of hardware SAN snapshot creation. The data read from the VM virtual disk is written into the final backup archive destination (which can be, for example, a local folder, a network share, FTP, NFS or a tape). The previously created SAN hardware snapshot is removed from the SAN using SAN API. Thus, the life span of the snapshot is advantageously reduced, which optimizes performance of the VM, e.g., a VMWARE™ VM.

FIG. 1 illustrates a workflow between the elements of the backup system, in accordance with the exemplary embodiment. A backup agent 120 is installed on Windows™ or Linux™ machine (which can be a physical or virtual machine, or can be a VM on an ESX(I) host 110). The backup agent creates backup of the VM as follows. In step 1, a snapshot of the VM to be backed up is created by VMWARE™ native snapshot operation.

According to the exemplary embodiment, the system can detect a VM running on the VM storage backed by SAN and apply the algorithm described above only to such VMs. For other VMs (located on non-SAN storages) there is a standard backup procedure used via vStorage API similar to VDDK from VMWARE™. Then, the hardware SAN snapshot 155 is created using SAN storage API called by the backup agent 120. Note that the API depends on a vendor.

In step 2, the VMWARE™ snapshot is removed (using standard VMWARE™ API), and the hardware SAN snapshot 155 is registered on the ESX(I) host 110 as a new datastore. This is a standard procedure for any SAN LUN 140, which can be attached to ESX(I) host as a datastore 160. In step 3, the VM virtual disk data is read from the new datastore residing on the ESX(I) host using VMWARE™ VDDK (standard vStorage API). This new datastore is a clone of the original datastore 160, which contains the state of the original datastore at the moment of hardware SAN snapshot creation. In step 4, the data read from the VM virtual disk is written into the final backup archive destination 130 (e.g., it can be a local folder, a network share, FTP, NFS or a tape). The previously created SAN hardware snapshot 155 is removed from SAN using SAN API. The snapshot is removed by a command sent to SAN through SSH or other protocols supported by a particular SAN vendor (i.e., a remote connection over network).

The life span of the VMWARE™ snapshot is significantly shortened, which results in a shorter time when the VMWARE™ VM underperforms. Note that the described method can be applied to any platform, and VMWARE™ VM is used here as an example. The proposed backup optimization method can be applied to any VM running on any host (not just ESX(I) host) as long as the hardware snapshot can be created and registered as a new datastore on the host.

Figure 2:
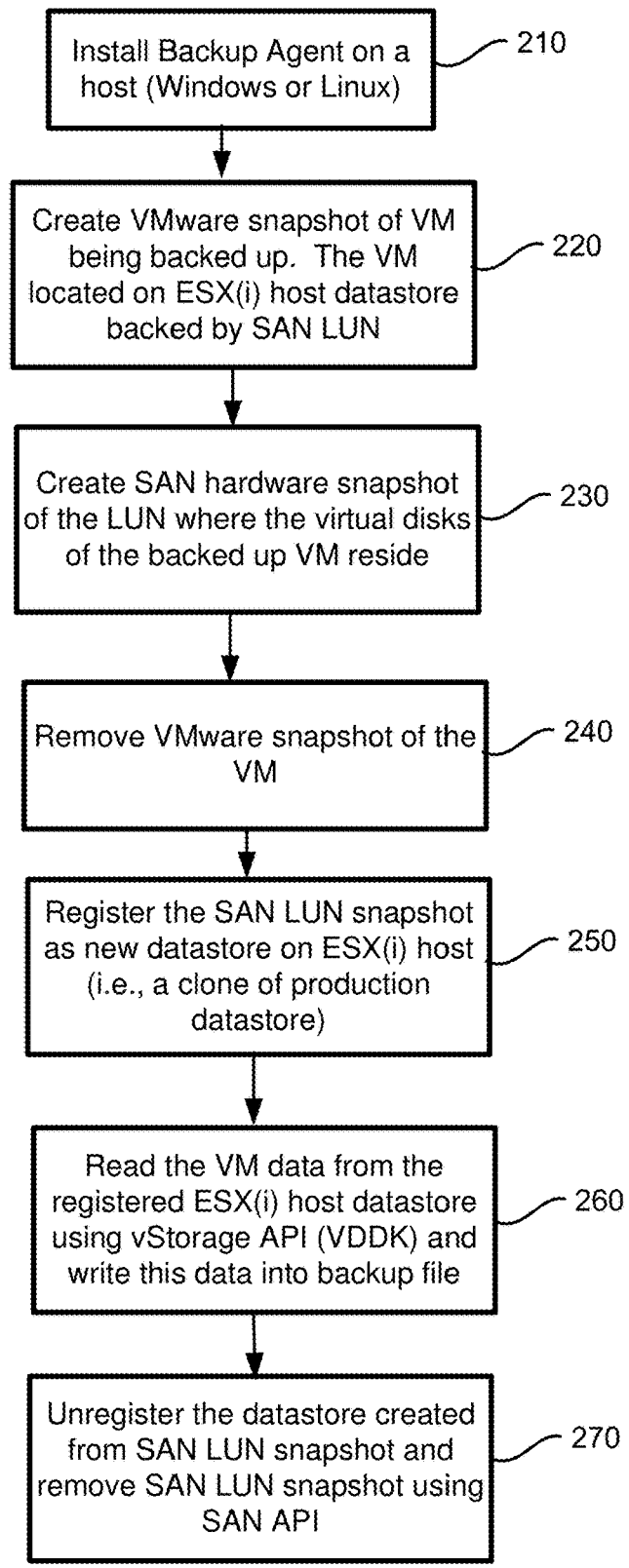
FIG. 2 illustrates a flow chart of a backup optimization method in accordance with the exemplary embodiment.

FIG. 2 illustrates a flow chart of a backup optimization method in accordance with the exemplary embodiment. In step 210, the process installs a backup agent on a physical machine connected to a host (e.g., ESX(I)). The backup agent is an external application to the VM subject to a backup, and controlled by the end user via a special interface. The end user has administration rights to the ESX(I) host that give him access to the VM subject to the backup. A snapshot of the VM being backed up is created in step 220.

The VM is located on the host datastore (e.g., ESX(I)) backed up by SAN LUN. In step 230, the process creates SAN hardware snapshot of the LUN where the virtual disks of the backed up VM reside. In step 240, the process removes the VM snapshot. In step 250, the process registers the SAN LUN snapshot as new datastore on ESX(I) host (i.e., a clone of the production datastore). In step 260, the process reads the VM data from the registered ESX(I) host datastore using vStorage API (VDDK) and writes this data into a backup file. Then, in step 270, the process unregisters the datastore created from SAN LUN snapshot and removes the SAN LUN snapshot using SAN API.

Figure 3:
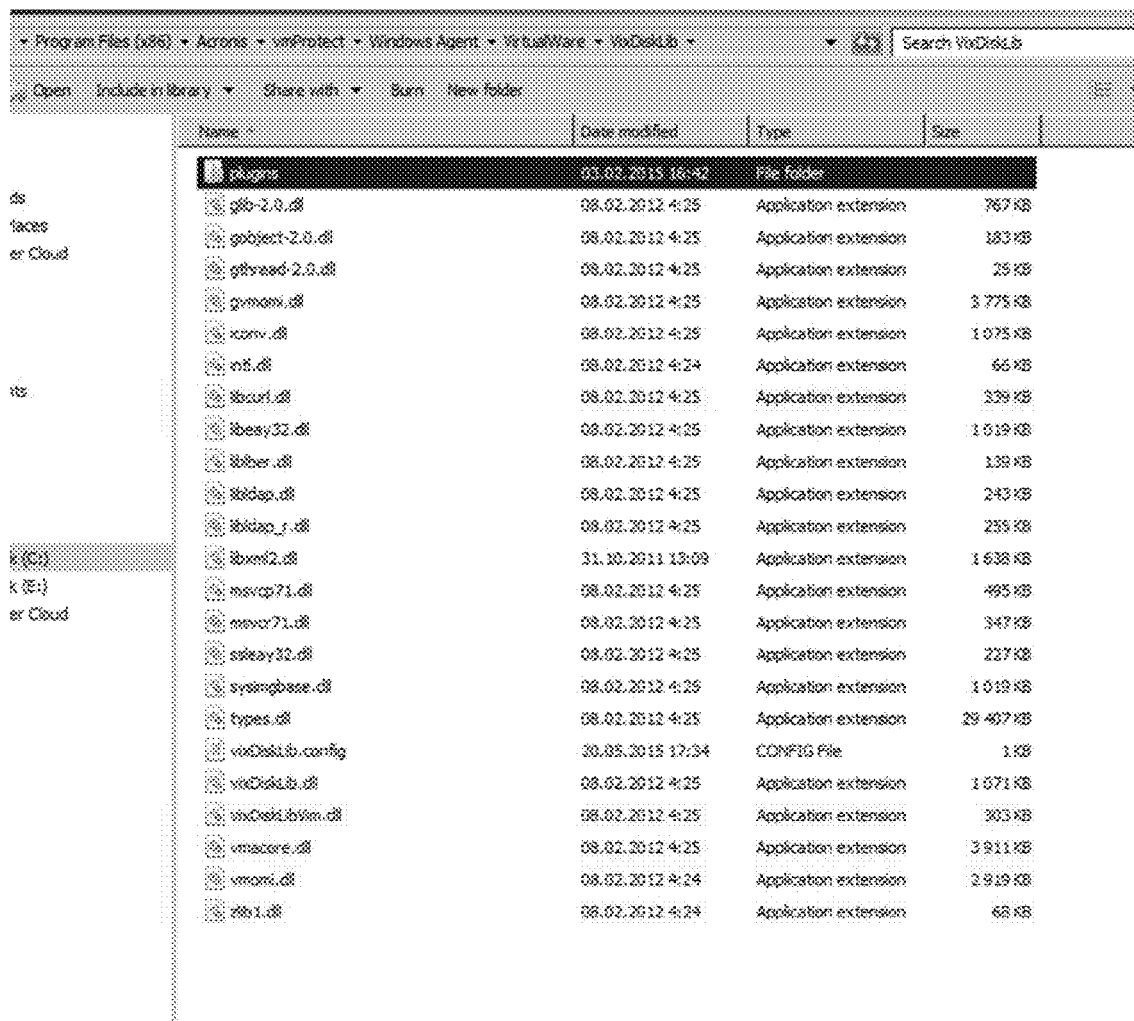
FIG. 3 is screen shot of VDDK libraries that can be used in the exemplary embodiment.

FIG. 3 is screen shot of VDDK libraries that can be used in the exemplary embodiment. The Virtual Disk Development Kit (VDDK) is a collection of C/C++ libraries, code samples, utilities, and documentation to help you create and access VMWARE™ virtual disk storage. The VDDK is useful in conjunction with the vSphere API for writing backup and recovery software, or similar applications.

Figure 4:
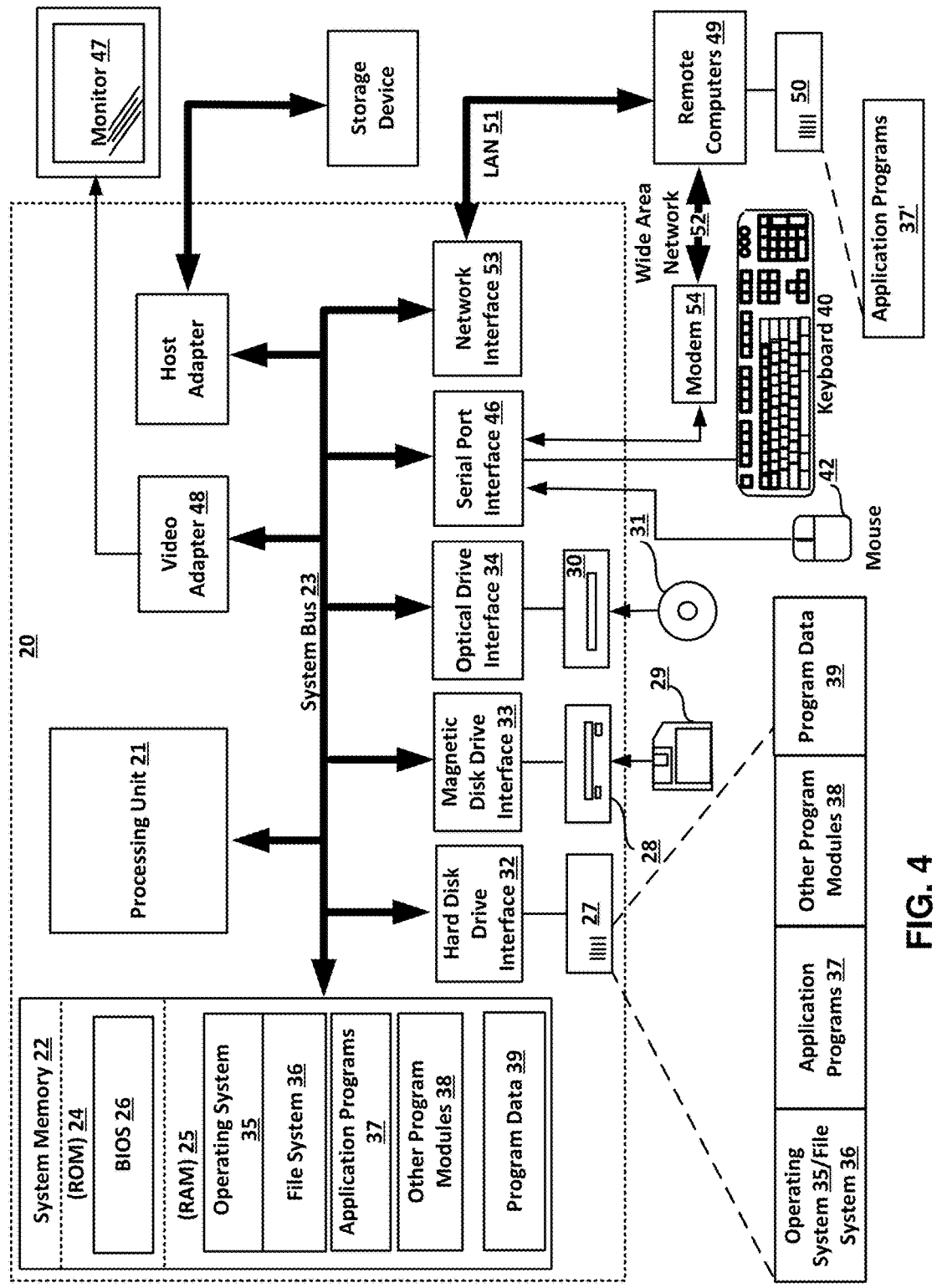
FIG. 4 illustrates an exemplary computer system that can be used for implementing the invention.

With reference to FIG. 4, an exemplary system for implementing the invention includes a general purpose computing device in the form of a computer system 20 or the like including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 104, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and system have been achieved. It should also be appreciated that various modifications, adaptations, and alternative embodiments thereof may be made within the scope and spirit of the present invention. The invention is further defined by the following claims.

What is claimed is:

1. A method for optimizing backup of a Virtual Machine (VM) from a snapshot, the method comprising:
    installing a backup agent on a physical machine, wherein the backup agent is configured to access a VM host where a VM to be backed up resides;
    creating a native snapshot of the VM by a native snapshot operation;
    calling a first storage application programming interface (API) using the backup agent;
    creating a hardware snapshot by the first storage API;

removing the native snapshot by a native storage API;
registering the hardware snapshot as a new datastore on the VM host;
reading a virtual disk of the VM into the new datastore using a second storage API;
writing data read from the virtual disk into a final backup archive destination; and
removing the hardware snapshot by a third storage API,
wherein the new datastore is a clone of an original native datastore, containing a state of the original native datastore at creation of the hardware snapshot.

2. The method of claim 1, wherein the backup agent is installed on a second VM.

3. The method of claim of claim 1, wherein the VM is a VMware™ VM.

4. The method of claim 1, wherein the native snapshot operation is a VMware™ API.

5. The method of claim 1, wherein the VM host is an ESX(i) host and the storage is a Storage Area Network (SAN) storage.

6. The method of claim 5, further comprising removing SAN hardware snapshot from the SAN storage using SAN API.

7. The method of claim 5, further comprising reading VM virtual disk data from the new datastore residing on the ESX(i) host using VMware™ Virtual Device Development Kit (VDDK).

8. The method of claim 1, further comprising installing a backup agent on a VM different from the VM being backed up.

9. The method of claim 1, wherein the VM host is running the same operating system as the VM.

10. The method of claim 1, wherein the VM host is running a different operating system than the VM.

11. The method of claim 1, wherein, a VMWare™ API is used for in the step of creating a snapshot of the VM.

12. A method for optimizing backup of a Virtual Machine (VM) from a snapshot, the method comprising:
installing a backup agent on a physical machine, wherein the backup agent is configured to access an ESX(i) host where a VM to be backed up resides;
creating a native snapshot of the VM using a VMware™ snapshot application programming interface (API);
calling a first Storage Area Network (SAN) storage API from the backup agent;
creating a SAN hardware snapshot by the first SAN storage API;
registering the hardware snapshot as a new datastore on the host;
reading a virtual disk of the VM from the new datastore using VMware™ vStorage API;
writing data read from the virtual disk into a final backup archive destination; and
removing the SAN hardware snapshot from the SAN storage using SAN API, wherein the new datastore is a clone of an original SAN datastore containing a state of the original SAN datastore at creation of the SAN hardware snapshot.

13. A system for optimizing backup of a Virtual Machine (VM) from a snapshot, the system comprising:
an ESX(i) host having VM to be backed running on it;
a physical machine having a backup agent running on it, the backup agent is configured to access the ESX(i) host;
a backup archive connected accessible by the backup agent;
a Storage Area Network (SAN) datastore connected to the ESX(i) host;
wherein the backup agent is configured to:
create a native snapshot of the VM using a VMware™ snapshot application programming interface (API);
call a SAN storage API;
create a SAN hardware snapshot by the SAN storage API;
register the SAN hardware snapshot as a new datastore on the ESX(i) host;
read a virtual disk of the VM from the new datastore using VMware™ vStorage API;
write data read from the virtual disk into the backup archive; and
remove the SAN hardware snapshot from the SAN datastore using SAN API, wherein the new datastore is a clone of the SAN datastore containing a state of the SAN datastore at creation of the SAN hardware snapshot.

* * * * *